UNITED STATES PATENT OFFICE 2,389,662

POLYMERS

Norman Gail Fisher and Richard Haven Wiley, Wilmington, Del., assignors to E. I. du Pont de Nemours & Company, Wilmington, Del., a corporation of Delaware No Drawing. Application September 3, 1942, Serial No. 457,144

1 Claim. (Cl. 260—63)

This invention relates to new polymeric products, and more particularly to new linear polymeric spirans.

This invention has as an object a new type of linear polymer. A further object is the preparation of new intermediates for textiles, bristles, transparent sheeting, coated fabric, electrical insulation, and the like. Other objects will appear hereinafter.

These objects are accomplished by the following invention of synthetic linear condensation polymers containing recurring spiro linkages; i. e., linkages formed by two rings joined together by a carbon atom common to both rings, said spiro linkages being an integral part of the linear polymeric chain. The products of this invention may be prepared by reacting under polymerizing conditions bifunctionally spiran-forming reactants, i. e., either (1) a mixture of at least two bifunctionally spiran-forming reactants, or (2) a mixture of linear polymer-forming reactants containing spiro linkages which will be incorporated as an integral part of the polymer chain or (3) a monomeric bifunctionally spiran-forming compound.

Spiro compounds are cyclic compounds containing two rings in which the two rings are joined by one atom (that starred below) common to both, for example:

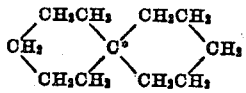

This compound is different from:

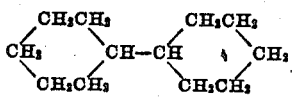

in that the valence angles of the starred carbon atom are fixed. The importance of this distinction can be seen for example in the fact that, if the two compounds are unsymmetrically substituted, the spiro compound can exist in optically active forms while the other compound cannot. See Gilman, Organic Chemistry, John Wiley & Sons 1938, vol. I, 256.

There are two types of linear polymers containing spiro linkages. In the first type, the fundamental structure of the polymer is a series of rings all united by spiro linkages as below

In a second type, units of two or more rings united by spiro linkages are separated by connecting radicals free from spiro linkages:

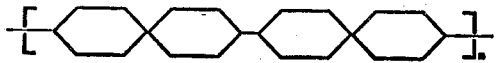

An example of the preparation of a polymer containing spiro linkages in the chain by the condensation of two bifunctionally linear spiran-forming compounds is the reaction of tetrakis (mercaptomethyl) methane and cyclohexanedione-1,4:

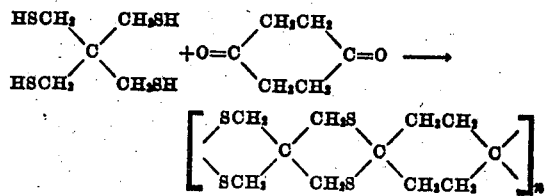

Here the reaction involved is that of thioketal formation; i. e., condensation of ketone and mercaptan.

Spiro polymers can likewise be prepared from the linear condensation of bifunctional molecules one or more of which contain a spiro linkage in such a way as to incorporate the spiro linkage as a part of the polymer chain, for example, using hexamethylene glycol and spiroundecane dicarboxylic acid:

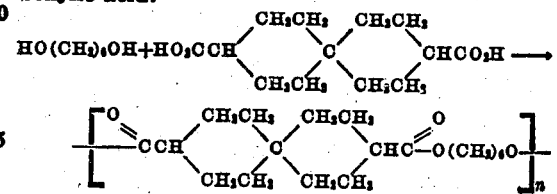

This reaction involves polyester formation as described in U. S. Patent 2,071,250 as the means of securing the polymeric spiran.

Still another method for the preparation of linear spiro polymers involves the self-condensation of a bifunctionally spiran-forming monomer such as 1,4-diaminocyclohexane-1,4-dicarboxylic acid:

This reaction involves polyamide formation.

In the above discussion the term "bifunctionally spiran-forming" is used in the sense that there are two sets of reactive groups each of which is capable of forming spiro groups. Thus, from this standpoint tetrakis (mercaptomethyl) methane is bifunctional in that it has two sets of reactive groups which can form spiro linkages:

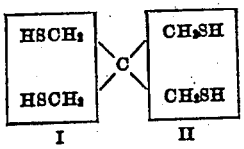

The groups included in I can form a spiran with cyclic ketone; i. e., cyclohexanone, as can also those in II. With another bi-functional spiran-forming reactant such as cyclohexanedione each pair of —SH groups, I and II, can react with a pair of carbonyl, C=O, group of the cyclohexanedione and on repetition a linear condensation polymer is formed. It is to be noted that although the compound tetrakis (mercaptomethyl) methane has four mercaptan groups it is still only bifunctional for the purposes of spiran formation. Similarly, the compound

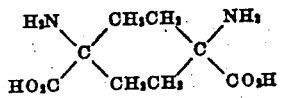

although containing two amino and two carboxylic acid groups, making four groups, yet is bifunctional for the purposes of spiran formation because the groups must react in pairs to form spiran linkages.

The polymers obtained from these reactions are particularly desirable because they contain spiro atoms, i. e. atoms in which the valence angles are fixed in space. Because of this peculiar structure the degrees of rotational freedom, present in ordinary linear polymers, are restricted. The result is that the products have new properties such as high softening point and low solubility, both of which are of first importance in the application of synthetic linear polymers to industry.

The more detailed practice of the invention is illustrated by the following examples, wherein parts given are by weight. There are of course many forms of the invention other than these specific embodiments.

EXAMPLE I

*Preparation of a spiro polymer from tetrakis (mercaptomethyl) methane and cyclohexanedione-1,4*

In 10 parts of purified dioxan were dissolved 2.0 parts of tetrakis (mercaptomethyl) methane having a M. P. of 72–73° C. and 1.12 parts by weight of cyclohexanedione-1,4, M. P. 76–77.5° C. The solution was cooled well and hydrogen chloride gas was passed in for a short time. No precipitate appeared until the solution came to room temperature when a cloudiness appeared followed by continuous precipitation until the whole mass was a white solid. The solid was removed from the test tube and heated under vacuum on a steam bath to remove the solvent. This left a white powder, the polymeric spirothioketal of 1,4-cyclohexanedione and tetrakis (mercaptomethyl) methane. This is insoluble in meta-cresol, formamide and butyl cellosolve, and has a melting point of 314–318° C.

The procedure was repeated using 3.948 parts by weight or 0.353 mol of the diketone and 7.051 parts by weight or 0.353 mol of the mercaptan. The reaction product was entirely similar in appearance to that above described.

The product was found to be insoluble in the following solvents: formamide, phenol, meta-cresol, butoxyethanol, piperazine, furfural, tetralin, cyclohexanediol, dimethylaniline, camphor, thiophene, chlorobenzene, carbon tetrachloride, and carbon disulfide. It was slightly soluble in boiling naphthalene and soluble in boiling anthracene. A molecular weight determination in anthracene gave a value of 613.

The tetrakis (mercaptomethyl) methane used above was obtained through the hydrogenation of the sulfur compound obtained from the treatment of tetrakis (bromomethyl) methane and sodium tetrasulfide. The cyclohexanedione-1,4 was obtained by the method of Meerwein, Ann. 398, 248 (1913).

EXAMPLE II

*Preparation of a spiro polymer from tetrakis (mercaptomethyl) methane and dodecanedione-2,11*

A solution of 1.0 part by weight (0.005 mol) of tetrakis (mercaptomethyl) methane and 1.13 parts by weight of dodecanedione-2,11 (0.005 mol) in 10 cc. of purified dioxan was prepared and cooled. Hydrogen chloride gas was passed into the solution for a short time and the solution was allowed to warm up until precipitation had set in. After proceeding thus at room temperature for five minutes, the solution was warmed slightly as the HCl was passed in. On standing, a precipitate of the polymeric spirothioketal of dodecanedione-2,11 and tetrakis (mercaptomethyl) methane was formed and separated by filtering and drying. It had a melting point of 153–167° C.

The polymer was partially soluble in benzene to give a solid having a melting point of 154–156° C. The residue was insoluble in benzene but soluble in phenol and had a M. P. of 158–168° C. The molecular weight in benzene was 1090.

The present invention is generic to linear polymers containing spiro linkages as a part of the chain and condensation polymerization reactions either adapted to the formation of spiro linkages or involving reactants possessing spiro linkages which will become a part of the chain including spiropolyethers such as those prepared from pentaerythritol by heating with sulfuric acid, phosphorus pentoxide, or other dehydrating reagents such as alumina and which has the following structure:

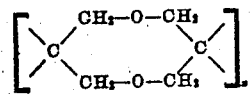

wherein $x$ is an integer; spiropolyesters such as that which can be prepared from the polyesterification, accomplished through the simultaneous application of heat (over 150° C.) and removal of the water formed in the self-condensation (a process disclosed in U. S. Patent 2,071,250) of 1,4-dihydroxy-1,4-cyclohexane dicarboxylic acid obtained in turn from 1,4-cyclohexanedione through its reaction with hydrogen cyanide (see Berichte 40, 2890 (1907)) which has the following structure:

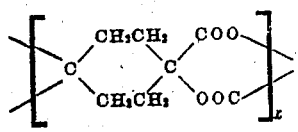

wherein $x$ is a plural integer; spiropolyamides similar to that which can be prepared by the self-condensation of 1,4-diamino-1,4-cyclohexanedicarboxylic acid described by Zelinsky and Schlesinger, Ber. 40, 2888 (1907), using the process of polyamide formation as disclosed in U. S. Patent 2,071,250 which has the structure:

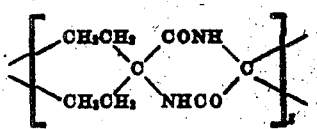

$x$ being a plural integer; spiropolyamides such as those prepared by the methods of condensation described in U. S. Patent 2,071,250, from a diamine and a dibasic spiro acid such as 2,6-spiroheptanedicarboxylic acid prepared by Backer et al., Rec. Trav. Chim., 50, 921 (1931) which polyamides have the formula

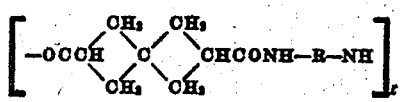

wherein $x$ is a plural integer; spiropolyamides such as those prepared in accordance with the procedure given in U. S. Patent 2,071,250, from 2,6-diamino spiroheptane which diamine has been described by Janson and Pope, Chemistry and Industry, 51, 316 (1932); spiropolyamides such as those prepared from 2,6-diamino spiroheptane and 2,6-spiroheptanedicarboxylic acid by the method described in U. S. Patent 2,071,250; interpolymers such as those prepared from 1,4-dihydroxy-1,4-cyclohexane dicarboxylic acid or other polyester forming compositions, a diamine such as 2,6-diaminospiroheptane, and a dibasic acid such as 2,6-spiroheptanedicarboxylic acid or other spiran-forming groups and combinations by the methods of polycondensation described in the above-mentioned patent, U. S. 2,071,250, and others.

A particularly valuable subgenus of the invention is that of the polymeric spirothioacetals including spirothioketals. In the preparation of spirothioketals and spirothioacetals, it is not necessary that the diketones dodecanedione-2,11 or cyclohexanedione-1,4 be used. Any compound containing two carbonyl groups which will lead to the formation of a linear polymer having spiro linkages may be used. As examples of such dicarbonyl compounds which will react to give spiro linkages with e. g. tetrakis(mercaptomethyl)methane are: aliphatic diketones such as acetyl acetone, acetonyl acetone, and octadione-2,7; aromatic diketones such as diacetobenzene; mixed aromatic aliphatic diketones such as benzoyl acetone; alicyclic diketones such as 1,3-cyclopentanedione. In addition such dialdehydes as succinic dialdehyde, adipic dialdehyde, or terephthalaldehyde may be employed. In this phase of the invention a preferred modification is that wherein any organic compound having a quaternary carbon joined to four alkyl groups each of which has a mercaptan group on the carbon next to the quaternary carbon is reacted with any diketaldonyl compound, i. e. a compound having two carbonyl groups of the aldehyde or ketone type. Another modification is that wherein any diketaldonyl compound having one but preferably both of the ketaldonyl groups in a ring is reacted with an aliphatic tetrathiol, i. e. an aliphatic compound having four thiol groups on different carbon atoms.

The reaction need not be carried out in the manner described in the examples above discussed but may be conducted along those lines known to lead to thioketal or thioacetal formation. The two reactants may be dissolved in a common solvent and treated with an acid catalyst or they may be treated in a melt with a similar catalyst. The solvent is preferably one in which the polymer is likewise soluble but need not be. As such solvents of particular value are benzene, ethoxyethanol, cyclohexane, anthracene, thiophene, furane, tetrahydrofurane, phenol, or cyclohexanol. The reaction mixture may be subjected to controlled prolonged heating in order to effect a more complete conversion to higher molecular weight products. As catalysts of particular value are anhydrous hydrogen chloride, sulfur dioxide, sulfur trioxide, aluminum trichloride, boron trifluoride, hydrogen bromide, hydrogen fluoride, or toluene sulfonic acid. These may be dissolved in the reactants or one of them prior to starting the reaction by applying heat or may be added to the mixture of reactants to start the reaction.

The invention is thus generic to linear polymers containing spiro linkages which are present as the result of a polycondensation reaction that forms recurrent spiro linkages or involves reactants containing preformed spiro linkages that become a part of the polymeric chain.

The chemical type of linkage whether ester, amide, thioamide, imidoether, thioimidoether, amidine, urethane, thiourethane, thionurethane, dithiourethane, urea, thiourea, guanidine, acetal, ketal, thioether, thioacetal, thioketal, sulfone, sulfonium salt, azomethine, amine, quaternary ammonium salt, or anhydride is not the essential part of the invention. Any of the reaction types known to the chemist skilled in the art may be applied to the formation of recurrent spiran linkages and any type of chemical grouping known to those skilled in the art may be used to form the polymer in the practice of the invention. The distinguishing feature that is important is the characteristic spiro grouping of the atoms in which one atom is shared in common by two rings. This grouping may be present in the polymer through being formed by the polymerization reaction or through being present in the molecule to be polymerized.

Particularly preferred are the linear condensation spiropolymers wherein the spiro carbons form part of a 5 to 6 membered ring. Of these the spirothioketals having spiro carbons attached to two sulfur atoms in a 5 to 6 membered ring are especially preferred.

The products of this invention may be used as fibers for textiles, monofils for bristles, transparent sheeting for wrapping foils and in coated fabrics.

The above description and examples are intended to be illustrative only. Any modification of or variation therefrom which conforms to the spirit of the invention is intended to be included within the scope of the claim.

What is claimed is:

The synthetic linear condensation polymeric spirothioketal of tetrakis(mercaptomethyl)methane and cyclohexanedione-1,4.

NORMAN GAIL FISHER.
RICHARD HAVEN WILEY.